(12) United States Patent
Morita et al.

(10) Patent No.: US 9,407,497 B2
(45) Date of Patent: Aug. 2, 2016

(54) COMMUNICATION TERMINAL

(71) Applicant: Panasonic Corporation, Osaka (JP)

(72) Inventors: Junichi Morita, Tokyo (JP); Yoshio Urabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 70 days.

(21) Appl. No.: 14/377,477

(22) PCT Filed: Dec. 3, 2013

(86) PCT No.: PCT/JP2013/007101
§ 371 (c)(1),
(2) Date: Aug. 7, 2014

(87) PCT Pub. No.: WO2014/091715
PCT Pub. Date: Jun. 19, 2014

(65) Prior Publication Data
US 2015/0016246 A1    Jan. 15, 2015

(30) Foreign Application Priority Data
Dec. 14, 2012   (JP) .............................. 2012-273276

(51) Int. Cl.
*H04L 12/24* (2006.01)
*H04L 12/26* (2006.01)
(Continued)

(52) U.S. Cl.
CPC ........ *H04L 41/0668* (2013.01); *H04L 43/0888* (2013.01); *H04L 45/22* (2013.01); *H04W 72/02* (2013.01); *H04W 72/085* (2013.01); *H04W 84/18* (2013.01)

(58) Field of Classification Search
None
See application file for complete search history.

(56) References Cited

U.S. PATENT DOCUMENTS 5,590,126 A * 12/1996 Mishra ................... H04L 45/00
370/238
6,882,628 B2   4/2005 Nakagawa et al.
(Continued)

FOREIGN PATENT DOCUMENTS

JP   2001-177596 A   6/2001
JP   2008-118722 A   5/2008
(Continued)

OTHER PUBLICATIONS

International Search Report dated Jan. 14, 2014, for corresponding International Application No. PCT/JP2013/007101, 6 pages.

*Primary Examiner* — Hicham Foud
(74) *Attorney, Agent, or Firm* — Seed IP Law Group PLLC (57) ABSTRACT

A transmission terminal communicates with a reception terminal using a first communication path (a 60 GHz band) or a second communication path (a 2.4 GHz band or 5 GHz band). A first communication path connection detector 17 detects the connection or disconnection of the first communication path to or from the reception terminal. A throughput measurement section measures the throughputs of the first communication path and the second communication path. On the basis of the result of the detection of the connection or disconnection and the throughputs of the first communication path and the second communication path, a terminal controller judges whether or not to switch a communication path for data transfer. A communication path switch switches the communication path for data transfer to the first communication path or the second communication path.

11 Claims, 9 Drawing Sheets

(51) Int. Cl.
*H04L 12/707* (2013.01)
*H04W 72/02* (2009.01)
*H04W 72/08* (2009.01)
*H04W 84/18* (2009.01)

(56) References Cited

U.S. PATENT DOCUMENTS

| | | | | |
|---|---|---|---|---|
| 8,189,479 | B1* | 5/2012 | Doherty | H04L 47/27 370/232 |
| 8,369,220 | B1* | 2/2013 | Khanna | H04L 41/5022 370/235 |
| 2001/0040873 | A1 | 11/2001 | Nakagawa et al. | |
| 2007/0064643 | A1* | 3/2007 | Tavares | H04W 48/18 370/328 |
| 2007/0115846 | A1* | 5/2007 | Kooyers | H04L 43/0847 370/252 |
| 2008/0101279 | A1* | 5/2008 | Russell | H04M 1/6066 370/328 |
| 2008/0232264 | A1* | 9/2008 | Horovitz | H04L 41/145 370/252 |
| 2009/0310494 | A1* | 12/2009 | Ou | H04L 41/06 370/252 |
| 2010/0332822 | A1 | 12/2010 | Liu et al. | |
| 2013/0130740 | A1 | 5/2013 | Saito | |

FOREIGN PATENT DOCUMENTS

| | | |
|---|---|---|
| JP | 2012-205253 A | 10/2012 |
| JP | 2012-531817 A | 12/2012 |

\* cited by examiner

|  | THROUGHPUT | NETWORK ACTIVITY | TS UTILIZATION |
|---|---|---|---|
| FIRST COMMUNICATION PATH | 0 | INACTIVE | NOT USED |
| SECOND COMMUNICATION PATH | 100Mbps | INACTIVE | MEASUREMENT DATA |

FIG. 6

|  | THROUGHPUT | NETWORK ACTIVITY | TS UTILIZATION |
|---|---|---|---|
| FIRST COMMUNICATION PATH | 0 | INACTIVE | NOT USED |
| SECOND COMMUNICATION PATH | 100Mbps | ACTIVE | DATA TRANSFER USING 5 TSS |

| | THROUGHPUT | NETWORK ACTIVITY | TS UTILIZATION |
|---|---|---|---|
| FIRST COMMUNICATION PATH | 2Gbps | ACTIVE | DATA TRANSFER USING 5 TSS |
| SECOND COMMUNICATION PATH | 100Mbps | INACTIVE | MEASUREMENT DATA |

FIG. 9 --PRIOR ART--

COMMUNICATION TERMINAL

TECHNICAL FIELD

This disclosure relates to a communication terminal for performing communication using a plurality of communication paths for wireless communication.

BACKGROUND ART

As portable communication terminals (for example, smart phones or tablet terminals) become highly functional and video contents become higher in density (high density), communication terminals are generally used to transmit and receive high image quality video files or large capacity files. For this reason, a communication terminal is required to transmit and receive large capacity files at high speed to and from the communication terminal of a destination communication party (hereafter simply referred to as "destination terminal").

As a high-speed communication method, short-distance wireless communication using a millimeter wave band is attracting attention. The millimeter wave communication enables wireless communication at a throughput on the order of Gbps or higher and is used, instead of infrared communication, as direct communication between a communication terminal and a destination terminal, thereby being expected as a communication method for reducing traffic on public wireless network.

In order that the millimeter wave communication is used widely in the future, the millimeter wave communication is required to coexist with wireless LAN (Local Area Network) communication that is used widely at present, and communication terminals are expected to use both the millimeter wave communication and the wireless LAN communication.

In comparison with the wireless LAN communication, in the millimeter wave communication, communication can be performed at high speed, but the communication distance is short and the directivity is strong. In other words, in comparison with the wireless LAN communication, in the millimeter wave communication, the throughput during wireless communication changes significantly and communication is disconnected depending on the usage of the communication terminal; for these reasons, the cooperation between the millimeter wave communication and the wireless LAN communication during communication, in particular, seamless switching therebetween, is thought to be important.

For example, in IEEE (The Institute of Electric and Electronics Engineers, Inc.) 802.11ad serving as the standard for 60 GHz band millimeter wave communication, the FST (Fast Session Transfer) technology has been standardized as a system for performing seamless and bidirectional communication path switching between the millimeter wave communication and the wireless LAN communication of a 5 GHz band or a 2.4 GHz band, that is, as a system for performing switching from the millimeter wave communication to the wireless LAN communication or from the wireless LAN communication to the millimeter wave communication. The FST technology is attracting attention as the standard for complementing the features of the millimeter wave communication.

In the communication of a communication terminal capable of performing the millimeter wave communication and the wireless LAN communication, by minimizing the overhead in the case that the millimeter wave communication is switched to the wireless LAN communication, the non-communication state in the case that the millimeter wave communication was disconnected can be minimized, whereby the high-speed performance of the millimeter wave communication can be utilized effectively. Furthermore, in the communication in which the communication terminal capable of performing the millimeter wave communication and the wireless LAN communication uses the FST technology, it is also necessary to consider power saving in data communication.

Figure 9:
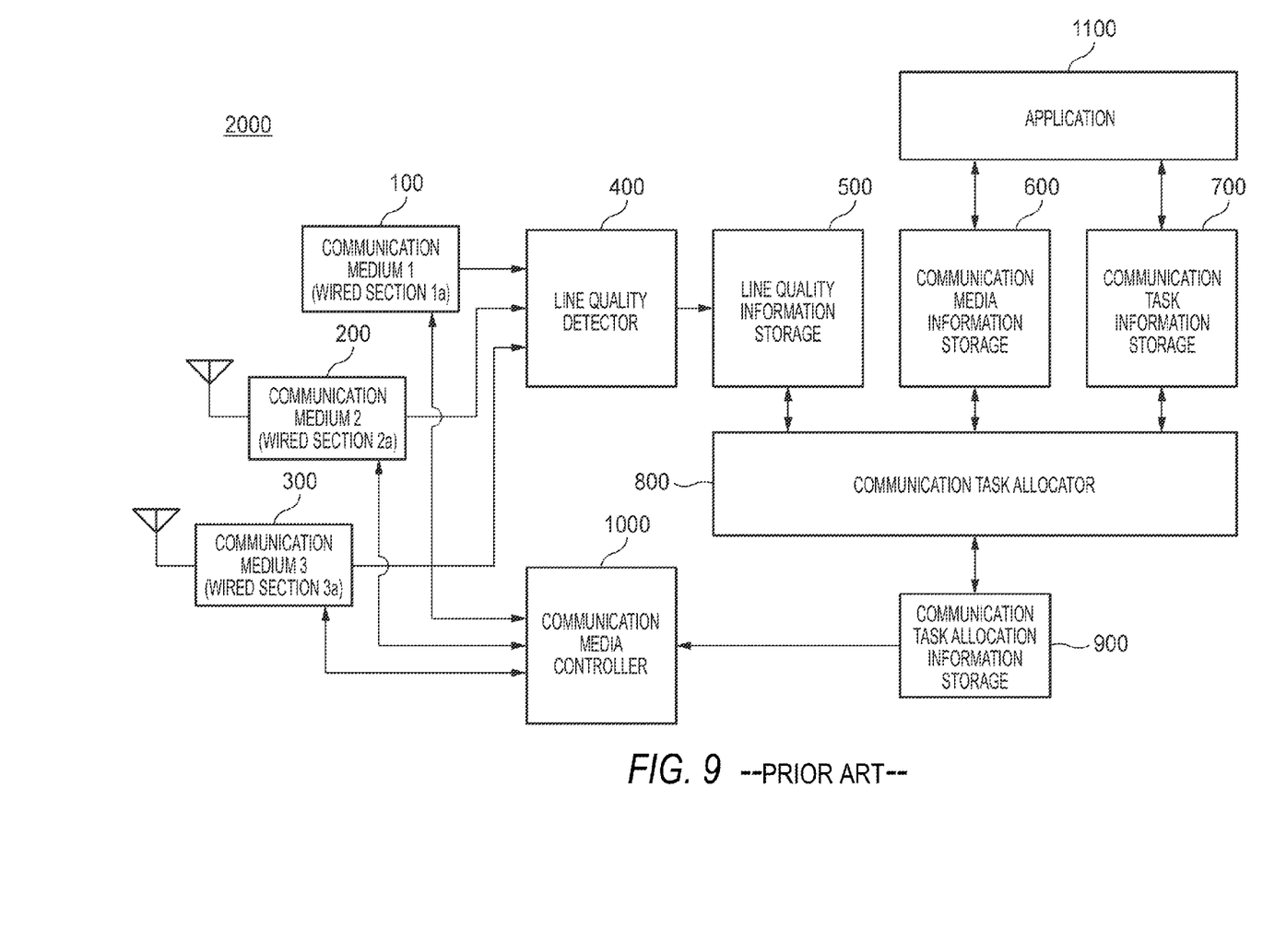
FIG. 9 is a block diagram showing the internal configuration of a conventional communication apparatus.

In a state in which a plurality of communication paths are available, as a method for switching the communication paths depending on a communication task (for example, file transfer), for example, the communication apparatus of Patent Document 1 is known (refer to FIG. 9). The communication apparatus of Patent Document 1 will be described later referring to FIG. 9.

PRIOR ART DOCUMENT

Patent Document

Patent Document 1: JP-A-2001-177596

GENERAL DESCRIPTION OF THE INVENTION

Problem that the Invention is to Solve

The inventors of the present invention have examined a communication terminal that performs communication using a plurality of communication paths for wireless communication. In Patent Document 1, however, it is described that communication paths are dynamically switched during data communication, but nothing is considered with respect to the overhead required for the switching of the communication paths.

To solve the conventional problems, this disclosure is intended to provide a communication terminal for seamlessly switching a communication path for data communication and reducing the overhead required for the switching of communication paths for wireless communication.

Means for Solving the Problem

This disclosure describes a communication terminal for communicating with a destination terminal using a first communication path and a second communication path, being equipped with a data transfer section for transferring data to be transferred to the destination terminal to the destination terminal via the first communication path or the second communication path; a first communication path connection detector for detecting the connection or disconnection of the first communication path to or from the destination terminal; a throughput measurement section for measuring at least one of the throughputs of the first communication path and the second communication path; a terminal controller for judging whether or not to switch the communication path for data transfer on the basis of the result of the detection of the connection or disconnection of the first communication path and at least one of the throughputs of the first communication path and the second communication path; and a communication path switch for switching the communication path for data transfer to the first communication path or the second communication path in the case that it is judged that the communication path for data transfer should be switched.

Advantage of the Invention

With this disclosure, a communication path for data transfer can be switched seamlessly, whereby the overhead

MODE FOR CARRYING OUT THE INVENTION (Circumstances Leading to the Contents of this Embodiment)

First, problems in a conventional communication terminal will be described referring to FIG. 9 before an embodiment of a communication terminal according to this disclosure is described. FIG. 9 is a block diagram showing the internal configuration of the conventional communication terminal.

The communication terminal 2000 shown in FIG. 9 includes a communication medium 100 corresponding to a wired section 1a, a communication medium 200 corresponding to a wireless section 2a, a communication medium 300 corresponding to a wireless section 3a, a line quality detector 400, a line quality information storage 500, a communication media information storage 600, a communication task information storage 700, a communication task allocator 800, a communication task allocation information storage 900, a communication media controller 1000 and an application 1100.

The communication terminal 2000 processes a plurality of communication tasks corresponding to the requests output from the application 1100 serving as high-order software.

The communication medium 100 is a wired communication medium and performs wired communication using the wired section 1a (for example, USB). The communication medium 200 and the communication medium 300 are wireless communication media and perform wireless communication using the wired section 2a (for example, Bluetooth (registered trademark)) and the wired section 3a (for example, IrDA), respectively.

The line quality detector 400 periodically detects the line quality of each of the communication media 100, 200 and 300 and stores each detection result in the line quality information storage 500. The communication media information storage 600 stores the performance information of each of the communication media 100, 200 and 300. When each communication task is generated, the communication task information storage 700 stores the information relating to each communication task.

The communication task allocator 800 allocates each communication task to each communication medium on the basis of the line quality information (for example, information on quality: "excellent", "good", "passing" or "failing") of each of the communication media 100, 200 and 300, the performance information (for example, communication speed) of each medium, and the information (for example, file size) of each communication task.

The communication task allocation information storage 900 stores information relating to the allocation of the respective communication tasks to the respective communication media 100, 200 and 300. On the basis of the information relating to the allocation of the respective communication tasks, the communication media controller 1000 distributes the respective communication tasks to the respective communication media, and the media operate in correspondence to the respective communication tasks.

More specifically, when a communication task (for example, file transfer) is generated, the communication task allocator 800 dynamically optimizes the allocation as to which communication medium is used to process the communication task for file transfer on the basis of the line quality information, the performance information and the communication task information of the respective communication media 100, 200 and 300.

For example, the communication task allocator 800 prioritizes the communication media being in the state of "good" or higher line quality in the order of higher communication speed and then prioritizes the communication media being in the state of "passing" line quality in the order of higher communication speed, thereby determining a communication medium by which the communication task for file transfer is processed.

While the communication task for file transfer is processed, in the case that a request for transferring a new file is generated, information (for example, a file size list) relating to the communication task for transferring the new file is added. On the basis of the line quality information, the performance information and the communication task information of the respective communication media 100, 200 and 300, the communication task allocator 800 causes different communication media to process the communication tasks for transferring the two files.

However, although Patent Documents 1 includes a description indicating that communication paths are changed dynamically during data communication, but does not sufficiently disclose an overhead required for the switching of the communication paths. In the switching of the communication paths, if preparation processing (for example, negotiation with a destination terminal) for the use of a communication path is executed to use the communication path of a switching destination, there is a problem that a large overhead is required for the switching of the communication paths in Patent Documents 1.

For example, it is assumed that an overhead on the order of several hundred milliseconds or more is anticipated each time the conventional communication terminal switches a communication path to a communication path for millimeter wave communication (for example, 60 GHz) or to a communication path for wireless LAN communication (5 GHz) using the FST technology.

In addition, Patent Documents 1 discloses that a plurality of communication paths are used simultaneously by performing parallel processing, but does not sufficiently disclose the power consumption required in the case that the plurality of communication paths are used simultaneously. Although there is a large difference in communication speed, for example, between the millimeter wave band (for example, 60 GHz) and IEEE 802.11n (for example, 5 GHz), high-speed data communication is made possible by using the communication paths simultaneously. However, the power consumption in the communication terminal may increase by using the communication paths simultaneously.

For example, in the case that data of 2.5 GB (Giga bytes) is transmitted using a communication path for a millimeter wave band (60 GHz) having a throughput of 2 Gbps (Giga bits per second), the transmission time of the data is approximately 10 seconds. On the other hand, in the case that a communication path for a millimeter wave band (60 GHz) and a communication path for the IEEE 802.11n (for example, 100 Mbps (Mega bits per second) are used simultaneously, the transmission time is approximately 9.5 sec. In other words, in the case that the communication path for the millimeter wave band and the communication path for the IEEE 802.11n are used simultaneously, the transmission time is shortened by at most approximately 500 milliseconds. On the other hand, there is a problem that, in the case that the communication path for the millimeter wave band and the communication path for the IEEE 802.11n are used simultaneously, the power consumption is approximately two times larger than that in the case that the communication path for the millimeter wave band (60 GHz) is used independently.

Under these circumstances, in an embodiment described below, an example of a communication terminal will be described in which a communication path for data communication is switched seamlessly to reduce the overhead required for the switching of communication paths for wireless communication.

(General Description of the Operation of a Communication Terminal According to an Embodiment)

Figure 1:
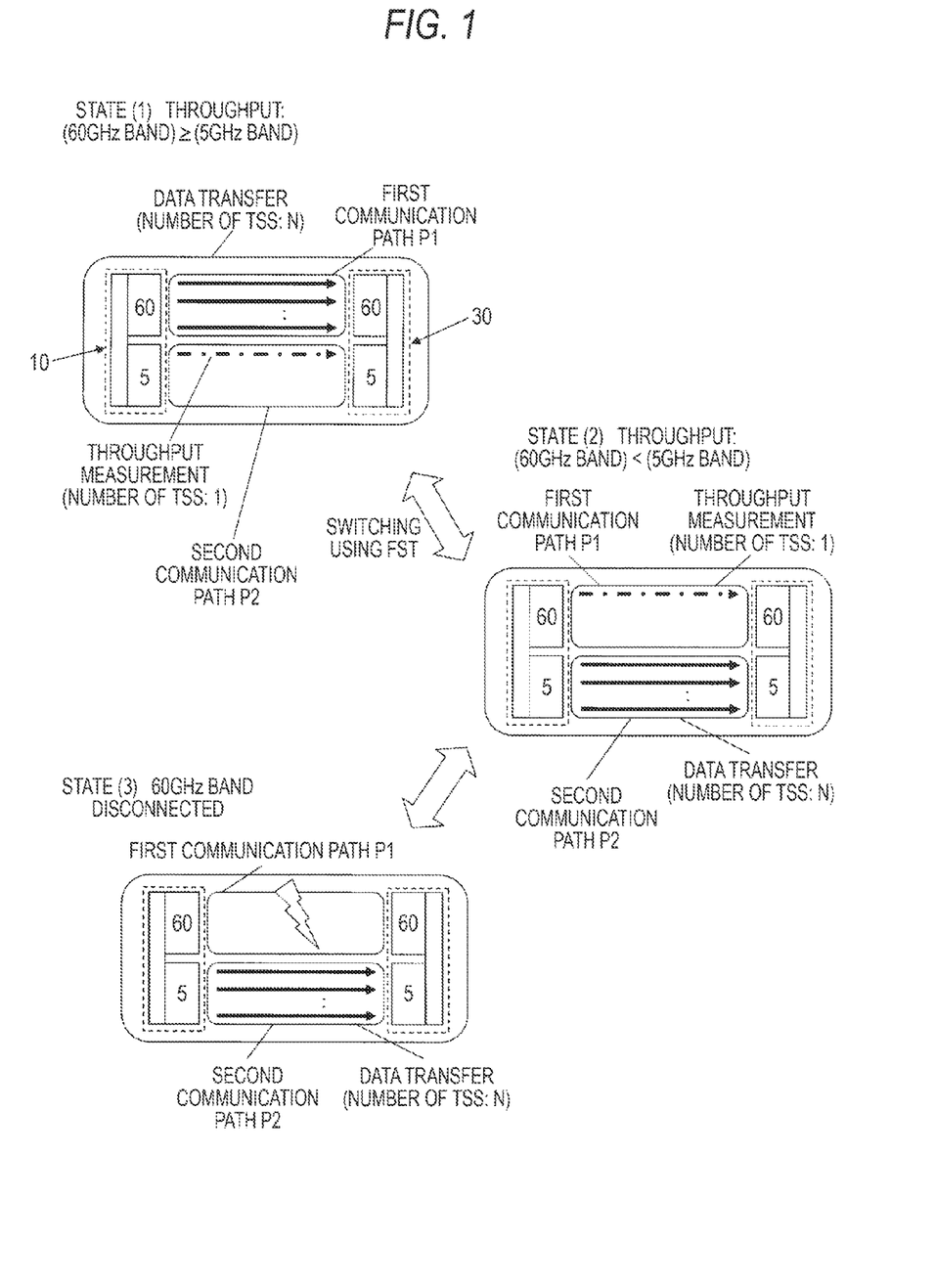
FIG. 1 is a view schematically illustrating an outline of the operations of a transmission terminal and a reception terminal according to an embodiment.

Next, an outline of the operations of a transmission terminal and a reception terminal serving as communication terminals according to an embodiment will be described referring to the drawings. FIG. 1 is a view schematically illustrating an outline of the operations of a transmission terminal 10 and a reception terminal 30 according to this embodiment.

The transmission terminal 10 and the reception terminal 30 perform data communication using two communication paths as a plurality of communication paths for wireless communication, for example, a first communication path P1 (for example, a 60 GHz band) for a millimeter wave band and a second communication path P2 (for example, a 5 GHz band) for wireless LAN communication. In this embodiment, it is assumed that the transmission terminal 10 and the reception terminal 30 can always perform communication using the second communication path P2 for the 5 GHz band. However, the number of the communication paths to be used by the transmission terminal 10 and the reception terminal 30 is not limited to two.

State (1) shown in FIG. 1 is a state in which the throughput of the first communication path P1 is equal to or larger than the throughput of the second communication path P2.

In state (1), the transmission terminal 10 establishes N (N: an integer) traffic streams (TS: Traffic Stream) between the transmission terminal 10 and the reception terminal 30 using the first communication path P1 and transmits data (for example, a high image quality video file or a large capacity file, the same applies to the following) to the reception terminal 30.

Furthermore, in state (1), the transmission terminal 10 establishes one traffic stream for throughput measurement between the transmission terminal 10 and the reception terminal 30 using the second communication path P2 and intermittently transmits throughput measurement data to the reception terminal 30.

State (2) shown in FIG. 1 is a state in which the throughput of the first communication path P1 is less than the throughput of the second communication path P2. In State (2), the transmission terminal 10 establishes N (N: an integer) traffic streams between the transmission terminal 10 and the reception terminal 30 using the second communication path P2 and transmits data to the reception terminal 30.

Moreover, in State (2), the transmission terminal 10 establishes one traffic stream for throughput measurement between the transmission terminal 10 and the reception terminal 30 using the first communication path P1 and intermittently transmits the throughput measurement data to the reception terminal 30.

State (3) shown in FIG. 1 is a state in which the first communication path P1 is disconnected and the second communication path P2 is connected. The transmission terminal 10 establishes N (N: an integer) traffic streams between the transmission terminal 10 and the reception terminal 30 using the second communication path P2 and transmits data to the reception terminal 30.

Although the number of data transfer streams in state (2) and state (3) is set to N, that is, the same number as that in state (1), other values may also be used.

The transmission terminal 10 and the reception terminal 30 judge whether or not to switch a communication path for data transfer on the basis of the connection/disconnection communication states of the first communication path P1 and the throughputs of the first communication path P1 and the second communication path P2. In the case that it is judged that the communication path for data transfer should be switched, the transmission terminal 10 and the reception terminal 30 perform switching from the communication path in state (1) to the communication path in state (2) or from the communication path in state (2) to the communication path in state (1) using the FST technology.

More specifically, in the case that the communication path for data transfer is the first communication path P1 (refer to state (1)), the transmission terminal 10 and the reception terminal 30 switch the communication path for data transfer to the second communication path P2 using the FST technology (refer to state (2)). On the other hand, in the case that the communication path for data transfer is the second communication path P2 (refer to state (2)), the transmission terminal 10 and the reception terminal 30 switch the communication path for data transfer to the first communication path P1 using the FST technology (refer to state (1)).

Besides, in the case that the communication path for data transfer is the second communication path P2, and the transmission terminal 10 and the reception terminal 30 are transferring the throughput measurement data using the first communication path P1 (refer to state (2)), when the first communication path P1 is disconnected, the transmission terminal 10 and the reception terminal 30 end the throughput measurement at the first communication path P1 but continue data transfer using the second communication path P2 (refer to state (3)).

Still further, in the case that the communication path for data transfer is the second communication path P2 and the first communication path P1 is disconnected (refer to state (3)), when the first communication path P1 is connected, the transmission terminal 10 and the reception terminal 30 continue data transfer using the second communication path P2 and intermittently transfer the throughput measurement data at the first communication path P1 using the first communication path P1 to the reception terminal 30 (refer to state (2)).

Figure 2:
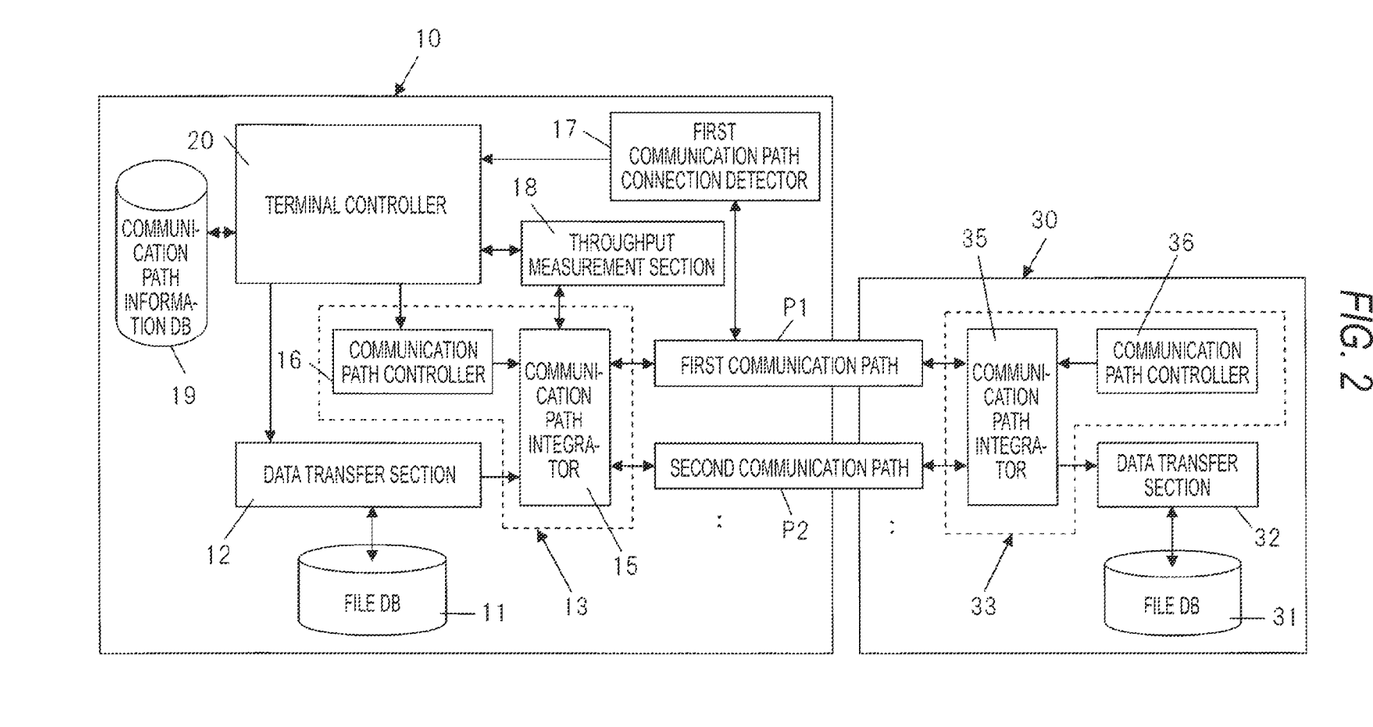
FIG. 2 is a block diagram showing the internal configurations of the transmission terminal and the reception terminal according to this embodiment.

FIG. 2 is a block diagram showing the internal configurations of the transmission terminal 10 and the reception terminal 30 according to this embodiment. The transmission terminal 10 includes a file DB 11, a data transfer section 12, a communication path switch 13, a first communication path connection detector 17, a throughput measurement section 18, a communication path information DB 19 and a terminal controller 20. The communication path switch 13 includes a communication path integrator 15 and a communication path controller 16.

The reception terminal 30 includes a file DB 31, a data transfer section 32 and a communication path switch 33. The communication path switch 33 includes a communication path integrator 35 and a communication path controller 36. Although the transmission terminal 10 and the reception terminal 30 shown in FIG. 2 have the same internal configuration, part of the internal configuration of the reception terminal 30 shown in FIG. 2 is omitted for ease of explanation.

Next, the operation of each element of the transmission terminal 10 will be described.

The file DB 11 serving as a data storage is configured so as to include, for example, a hard disk or a flash memory built in the transmission terminal 10, and stores data, for example, files, to be transferred (transmitted) to the reception terminal 30 in accordance with the operation of the user.

The data transfer section 12 reads data (for example, files) to be transferred to the reception terminal 30 from the file DB 11 in accordance with the operation of the user and transfers the read data (for example, files) using the first communication path P1 and the second communication path P2.

The first communication path P1 is a communication path for wireless communication in which a frequency band (for example, a 60 GHz band) capable of performing millimeter wave communication is used. The second communication path P2 is a communication path for wireless communication in which a frequency band (for example, a 5 GHz band) capable of performing wireless LAN communication is used. However, the second communication path P2 may be a communication path capable of performing wired LAN communication.

A control signal output from the terminal controller 20 is input to the communication path switch 13. The control signal is a signal for switching a communication path for data transfer. The communication path switch 13 seamlessly switches the communication path for data transfer using the FST technology in accordance with the control signal. In this embodiment, the communication path switch 13 seamlessly switches the communication path for data transfer from the first communication path P1 to the second communication path P2 or from the second communication path P2 to the first communication path P1.

The communication path integrator 15 virtually integrates the first communication path P1 and the second communication path P2 (a bonding function). More specifically, the communication path integrator 15 virtually assumes the respective MAC (Media Access Control) addresses for identifying the first communication path P1 and the second communication path P2 as one MAC address and controls the data communication paths to the reception terminal 30 without making the other elements of the transmission terminal 10 recognize which communication paths they are using at present.

Hence, the communication path switch 13 makes a high-order layer (for example, the application layer) recognize that one IP (Internet Protocol) address is given to the communication paths between the transmission terminal 10 and the reception terminal 30, that is, without making the layer recognize that the communication path for data transfer has been switched, thereby being capable of seamlessly switching the communication path for data transfer.

The communication path controller 16 establishes a communication session between the transmission terminal 10 and the reception terminal 30 by negotiating with the reception terminal 30 and seamlessly switches the communication path for data transfer to the first communication path P1 or the second communication path P2 by using, for example, the FST technology described in the IEEE 802.11ad Standard.

The first communication path connection detector 17 detects whether the first communication path P1 was connected or disconnected to or from the reception terminal 30 by using, for example, a connection authentication technology in a supplicant for use in wireless LAN communication, and outputs the result of the detection to the terminal controller 20.

The throughput measurement section 18 measures the throughputs of the first communication path P1 and the second communication path P2. The throughput measurement section 18 measures, for example, a throughput using the RTT (Round Trip Time) of the TCP (Transmission Control Protocol) while data (for example, files) read from the file DB 11 is transferred, when the path to be measured is used as a communication path for data transfer. For example, in state (1), the communication path corresponds to the first communication path P1; in state (2), the communication path corresponds to the second communication path P2; and in state (3), the communication path corresponds to the second communication path P2.

On the other hand, the throughput measurement section 18 may measure the throughput on the basis of the reciprocating time obtained using PING of the IP communication at the second communication path P2 in state (1) and at the first communication path P1 in state (2).

In other words, in accordance with states (1) to (3), the communication path in which the throughput is measured may be either the first communication path P1 or the second communication path P2, or may be both the first communication path P1 and the second communication path P2.

The communication path information DB 19 is configured so as to include, for example, a hard disk or a flash memory built in the transmission terminal 10, and stores communication path information including the utilization status of the first communication path P1 and the second communication path P2 serving as communication paths that are used by the transmission terminal 10. The specific contents of the communication path information DB 19 will be described later referring to FIGS. 5 to 8.

On the basis of the detection result output from the first communication path connection detector 17 and the throughput measurement result output from the throughput measurement section 18, the terminal controller 20 updates the communication path information of the communication path information DB 19 and furthermore judges whether or not to switch the communication path for data transfer.

In the case that it is judged that the communication path for data transfer should be switched, the terminal controller 20 outputs a control signal for switching the communication path for data transfer to the communication path controller 16. Moreover, in the case that the other communication path not used as the communication path for data transfer is connected, the terminal controller 20 establishes a traffic stream for measuring the throughput at the other communication path.

Next, the operations of the respective elements of the reception terminal 30 will be described.

The file DB 31 serving as a data storage is configured so as to include, for example, a hard disk or a flash memory built in the reception terminal 30, and stores data (for example, files) transmitted from the transmission terminal 10 in accordance with the operation of the user.

The data transfer section 32 receives the data (for example, files) transmitted from the transmission terminal 10 and stores the received data (for example, files) in the file DB 31.

A control signal output from the terminal controller (not shown) of the reception terminal 30 is input to the communication path switch 33. The control signal is a signal for switching a communication path for data transfer. The communication path switch 33 seamlessly switches the communication path for data transfer using the FST technology in accordance with the control signal. In this embodiment, the communication path switch 33 seamlessly switches the communication path for data transfer from the first communication path P1 to the second communication path P2 or from the second communication path P2 to the first communication path P1.

The communication path integrator 35 virtually integrates the first communication path P1 and the second communication path P2 (a bonding function). More specifically, the communication path integrator 35 virtually assumes the respective MAC (Media Access Control) addresses for identifying the first communication path P1 and the second communication path P2 as one MAC address and controls the data communication paths to the transmission terminal 10 without making the other elements of the reception terminal 30 recognize which communication paths they are using at present.

Hence, the communication path switch 33 makes an upper layer (for example, the application layer) recognize that one IP (Internet Protocol) address is given to the communication path between the transmission terminal 10 and the reception terminal 30, that is, without making the layer recognize that the communication path for data transfer has been switched, thereby being capable of seamlessly switching the communication path for data transfer.

The communication path controller 36 establishes a communication session between the transmission terminal 10 and the reception terminal 30 by negotiating with the transmission terminal 10 and seamlessly switches the communication path for data transfer to the first communication path P1 or the second communication path P2 by using, for example, the FST technology described in the IEEE 802.11ad Standard.

Figure 3:
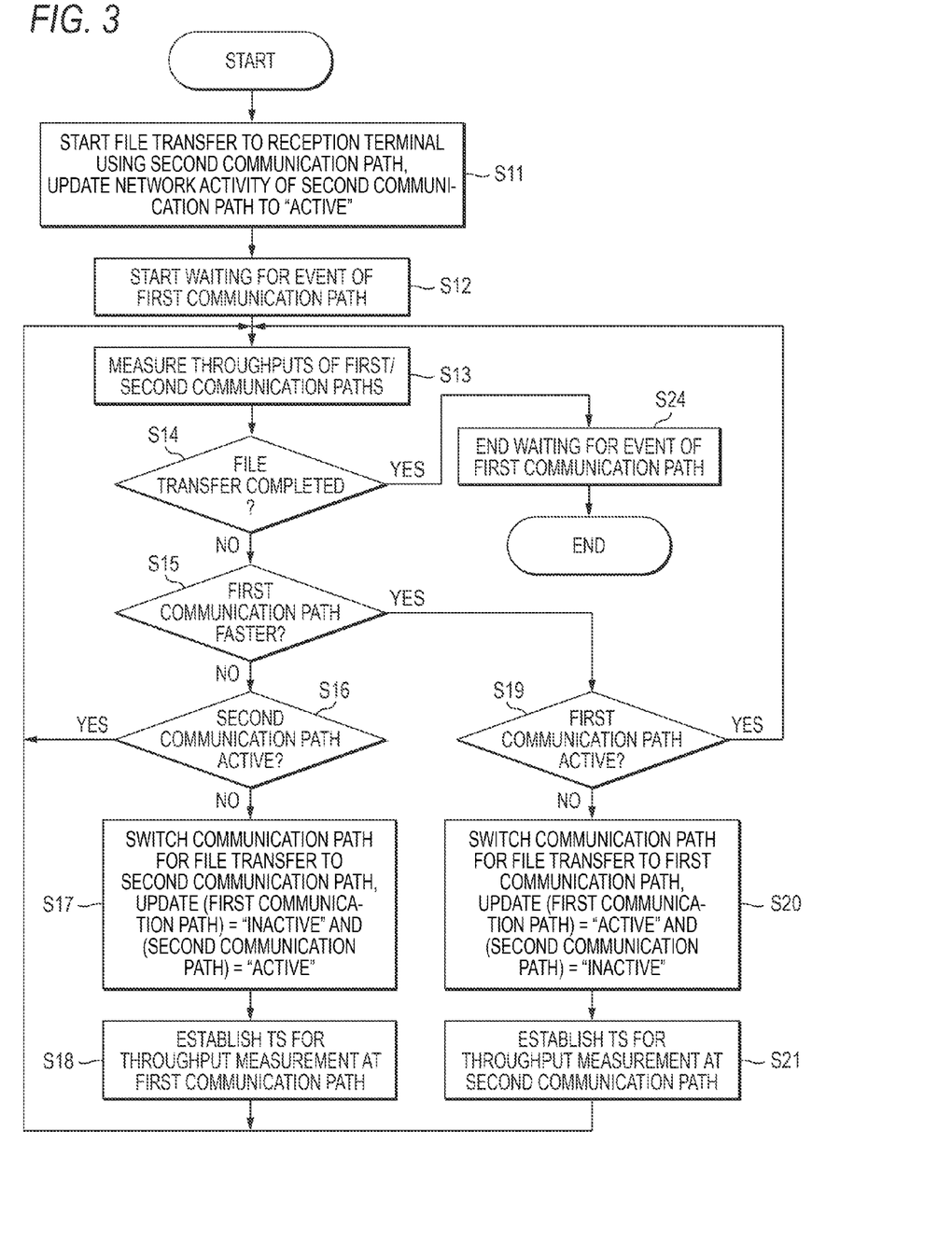
FIG. 3 is a flow chart illustrating an operation procedure wherein the transmission terminal according to this embodiment performs communication path switching on the basis of the throughput at each communication path.
Figure 4:
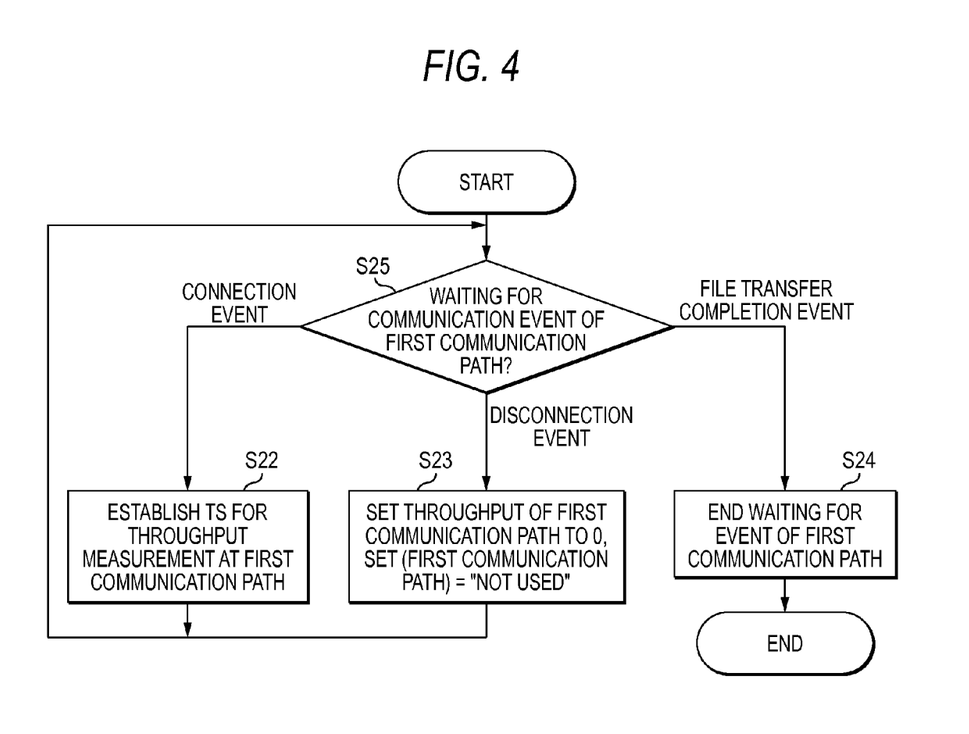
FIG. 4 is a flow chart illustrating an operation procedure wherein the transmission terminal according to this embodiment waits for an event of a first communication path.

Next, referring to FIGS. 3 to 8, the operation of the transmission terminal 10 for transferring (transmitting) data, for example, files stored in the file DB 11 to the reception terminal 30 will be described. FIG. 3 is a flow chart illustrating an operation procedure wherein the transmission terminal 10 according to this embodiment performs communication path switching on the basis of the throughput at each communication path. FIG. 4 is a flow chart illustrating an operation procedure wherein the transmission terminal 10 according to this embodiment waits for an event of the first communication path.

Figure 5:
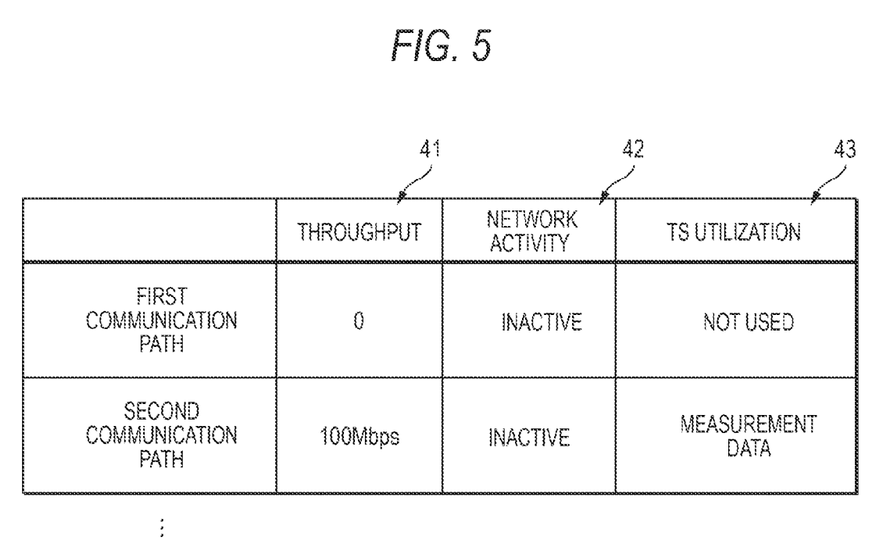
FIG. 5 is an example of communication path information in the state before the start of file data transfer.
Figure 6:
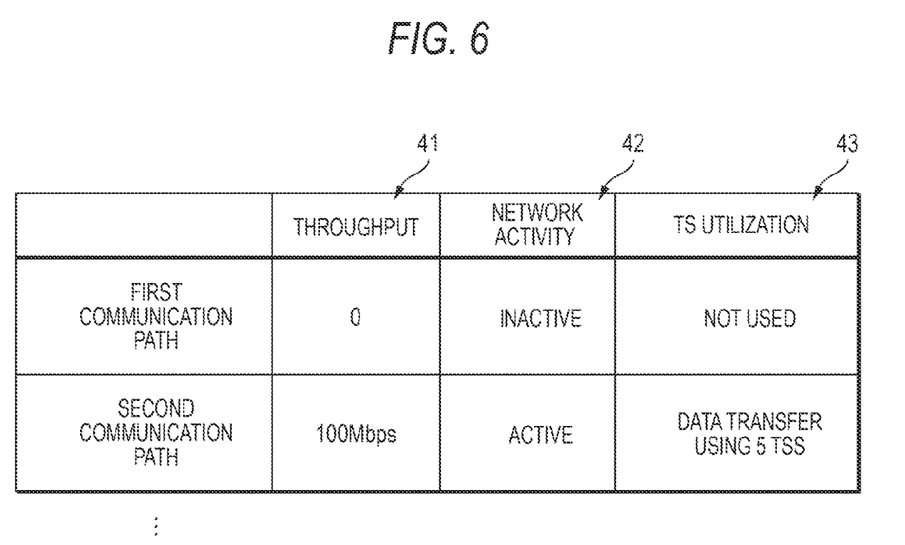
FIG. 6 is an example of communication path information in the state after the start of file data transfer.
Figure 7:
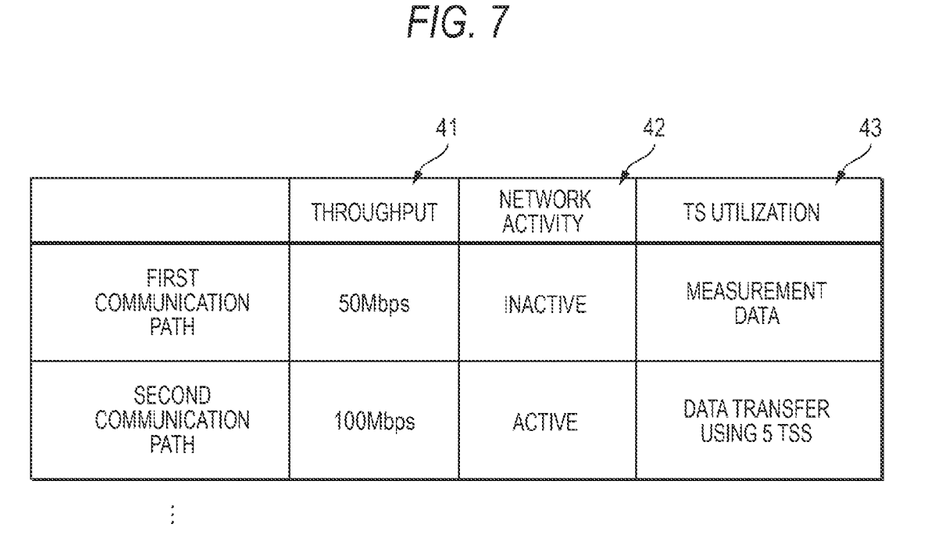
FIG. 7 is an example of communication path information in the case that the throughput of a second communication path is larger than the throughput of the first communication path.
Figure 8:
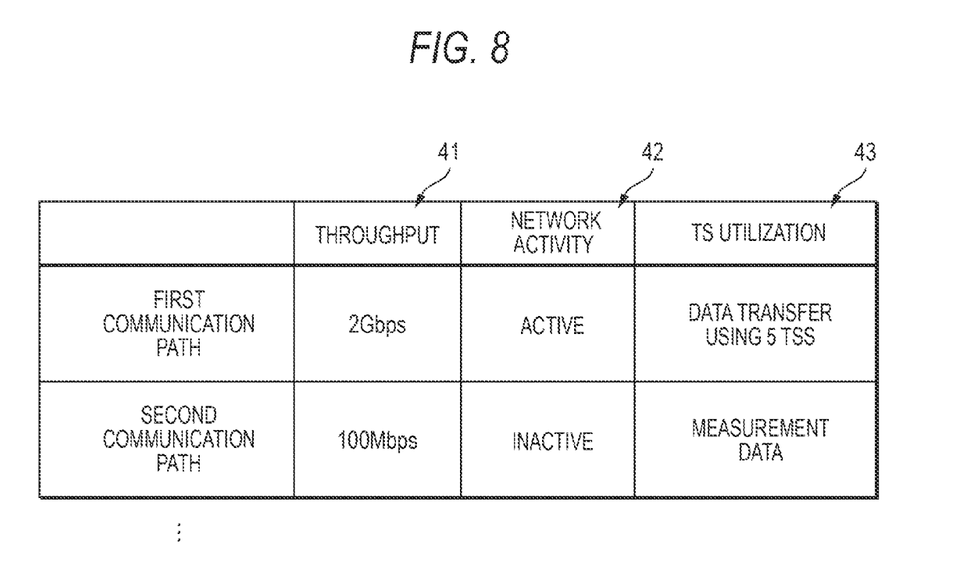
FIG. 8 is an example of communication path information in the case that the throughput of the first communication path is larger than the throughput of the second communication path.

FIG. 5 is an example of communication path information in the state before the start of file data transfer. FIG. 6 is an example of communication path information in the state after the start of file data transfer. FIG. 7 is an example of communication path information in the case that the throughput of the second communication path P2 is larger than the throughput of the first communication path P1. FIG. 8 is an example of communication path information in the case that the throughput of the first communication path P1 is larger than the throughput of the second communication path P2.

In the flow charts shown in FIGS. 3 and 4, the first communication path P1 is described as a communication path for the millimeter wave band (for example, 60 GHz) in which communication is liable to be disconnected although a throughput on the order of Gbps is obtained at the maximum, and the second communication path P2 is described as a communication path in which a throughput of approximately 100 Mbps is obtained stably and communication is hardly disconnected.

The communication path information shown in FIG. 5 includes the throughput 41, the network activity 42 and the TS utilization 43 of each communication path. The throughput 41 indicates the latest value of the throughput of each communication path measured by the throughput measurement section 18. In FIG. 5, the throughput 41 of the first communication path P1 is "0" and the throughput 41 of the second communication path P2 is "100 Mbps".

The network activity 42 indicates the utilization status of each communication path. In FIG. 5, the network activity 42 of the first communication path P1 is "inactive" and the network activity 42 of the second communication path P2 is "inactive". "Inactive" indicates a status in which the communication path is used for throughput measurement or disconnected. "Active" indicates a status in which the communication path is used for file data transfer.

The TS utilization 43 indicates the traffic stream utilization status on each communication path. In FIG. 5, the TS utilization 43 of the first communication path P1 is "not used" and the TS utilization 43 of the second communication path P2 is "measurement data". In other words, before the transmission terminal 10 starts file transfer, the first communication path P1 is disconnected, but the second communication path P2 is connected, and the throughput measurement data (for example, PING data) is transmitted through the traffic stream established at the second communication path P2.

In FIG. 3, the terminal controller 20 causes the data transfer section 12 to read designated data to be transferred (for example, files) from the file DB 11 in accordance with the operation of the user. In other words, the data transfer section 12 reads the data to be transferred (for example, files) from the file DB 11 and transfers the data (for example, files) using the second communication path P2 (at S11).

In the case that data (for example, files) is transmitted, the terminal controller 20 establishes, for example, five transfer streams between the transmission terminal 10 and the reception terminal 30. Since the communication path information of each communication path before the start of the transfer of the file data is the communication path information shown in FIG. 5, the terminal controller 20 updates the communication path information of the second communication path P2 shown in FIG. 5 to the communication path information of the second communication path P2 shown in FIG. 6 after the start of the transfer of the file data.

More specifically, the terminal controller 20 updates the network activity 42 in the communication path information of the second communication path P2 from "inactive" to "active" and updates the TS utilization 43 from "measurement data" to "data transfer using five TSs" (at S11).

After the data transfer section 12 started file data transfer using the second communication path P2 at step S11, the first communication path connection detector 17 detects whether the first communication path P1 was connected or disconnected and outputs the result of the detection to the terminal controller 20 (at S12, refer to FIG. 4). The operation shown in FIG. 4 is performed not only at step S12 of the flow chart shown in FIG. 3, but also performed asynchronously with the operation of each step of the flow chart shown in FIG. 3.

In FIG. 4, the terminal controller 20 waits for the output of, for example, a connection event, a disconnection event or a file data transfer completion event as a communication event that is output from the first communication path connection detector 17 as the detection result at the first communication path P1 (at S25).

After obtaining the connection event as the detection result of the first communication path P1 output from the first communication path connection detector 17, that is, the result of the detection indicating that the first communication path P1 was connected, the terminal controller 20 establishes a traffic stream for throughput measurement at the first communication path P1 (at S22). Furthermore, the terminal controller 20 updates the communication path information of the first communication path P1 shown in FIG. 6 to the communication path information of the first communication path P1 shown in FIG. 7.

More specifically, the terminal controller 20 updates the throughput 41 in the communication path information of the first communication path P1 from "0" to "50 Mbps" and updates the TS utilization 43 from "not used" to "measurement data". After step S22, the operation of the terminal controller 20 returns to step S25.

After obtaining the disconnection event as the detection result of the first communication path P1 output from the first communication path connection detector 17, that is, the result of the detection indicating that the first communication path P1 was disconnected, the terminal controller 20 updates the throughput 41 in the communication path information of the first communication path P1 to "0", updates the network activity 42 to "inactive" and updates the TS utilization 43 to "not used" (at S23). After step S23, the operation of the terminal controller 20 returns to step S25.

After obtaining the file data transfer completion event as the detection result of the first communication path P1 output from the first communication path connection detector 17, the terminal controller 20 stops waiting for the output of the communication event serving as the detection result of the first communication path P1 output from the first communication path connection detector 17 (at S24).

As the communication events, events more than the above-mentioned three events may also be used, and processing steps are provided for each event.

The description of the flow chart shown in FIG. 3 will be continued hereafter assuming that, after step S12, the first communication path connection detector 17 detected that the first communication path P1 was connected and the terminal controller 20 updated the communication path information of the first communication path P1 of the communication path information DB 19 to the communication path information of the first communication path P1 shown in FIG. 7.

According to the control signal, output from the terminal controller 20, for measuring the throughputs of the first communication path P1 and the second communication path P2, the throughput measurement section 18 measures the throughputs of the first communication path P1 and the second communication path P2 (at S13).

More specifically, in the case that the traffic stream for throughput measurement has been established at the first communication path P1, the throughput measurement section 18 intermittently measures the throughput at the first communication path P1 using the round trip time of the throughput measurement data flowing through the traffic stream for throughput measurement. The throughput measurement section 18 outputs the throughput data of the first communication path P1 to the terminal controller 20. The round trip time of the throughput measurement data is the time required for the round trip of the throughput measurement data from the transmission terminal 10 to the reception terminal 30.

At a communication path in which the traffic stream for throughput measurement has been established, the throughput measurement data is communicated intermittently. The cycle of the intermittent communication dynamically changes in accordance with the situations of the transmission terminal 10 and the reception terminal 30. For example, in a situation in which the connection of a communication path continues relatively stable, the cycle of the intermittent communication becomes long, and in a situation in which the switching between a 60 GHz band communication path and a 5 GHz band communication path is performed frequently, the cycle of the intermittent communication becomes short. The terminal controller 20 refers to the communication path information of the communication path information DB 19 and outputs the control signal for measuring the throughput to the throughput measurement section 18 as necessary in correspondence with the situations of the first communication path P1 and the second communication path P2.

Furthermore, in the case that the traffic stream for file data transfer has been established at the second communication path P2, the throughput measurement section 18 measures the throughput at the second communication path P2 using the round trip time of data (for example, files) flowing through the traffic stream for file data transfer. The throughput measurement section 18 outputs the throughput data of the second communication path P2 to the terminal controller 20. The round trip time of the data (for example, files) is the sum of the time required for the transfer of files, that is, data, from the transmission terminal 10 to the reception terminal 30 and the time required for the transfer of the Ack signal indicating that the data has been received from the reception terminal 30 to the transmission terminal 10.

By using the latest value data of the throughputs of the first communication path P1 and the second communication path P2 measured by the throughput measurement section 18, the terminal controller 20 updates the data of the throughput 41 of each communication path in the communication path information DB 19 to the latest value data.

After step S13, in the case that the transmission terminal 10 has completed the file data transfer (YES at S14), the terminal controller 20 stops waiting for the output of the communication event serving as the detection result of the first communication path P1 output from the first communication path connection detector 17 (at S24). As a result, the operation of the transmission terminal 10 ends.

After step S13, in the case that the transmission terminal 10 has not completed the file data transfer (NO at S14), the terminal controller 20 compares the throughput data of the first communication path P1 and the throughput data of the second communication path P2 (at S15).

In the case that the throughput of the second communication path P2 is larger than the throughput of the first communication path P1 (NO at S15, refer to state (2) shown in FIG. 1 or refer to FIG. 7), the terminal controller 20 judges whether the network activity 42 of the communication path information of the second communication path P2 is "active" (at S16).

In the case that it is judged that the network activity 42 of the communication path information of the second communication path P2 is "active" (YES at S16), the terminal controller 20 causes the data transfer section 12 to continue the file data transfer. The operation of the terminal controller 20 returns to step S13.

On the other hand, in the case that it is judged that the network activity 42 of the communication path information of the second communication path P2 is not "active" (NO at S16), the terminal controller 20 judges that the communication path for file data transfer should be switched from the first communication path P1 to the second communication path P2 (at S17) and outputs a control signal for switching the communication path for file data transfer from the first communication path P1 to the second communication path P2.

According to the control signal output from the terminal controller 20, the communication path controller 16 switches the communication path for file data transfer from the first communication path P1 to the second communication path P2 using the FST technology (at S17). Furthermore, the terminal controller 20 updates the network activity 42 of the first communication path P1 of the communication path information DB to "inactive" and updates the network activity 42 of the second communication path P2 to "active" (at S17, refer to FIG. 7).

Moreover, the terminal controller 20 establishes a traffic stream for throughput measurement at the first communication path P1 (at S18). After step S18, the operation of the terminal controller 20 returns to step S13.

On the other hand, in the case that the throughput of the first communication path P1 is larger than the throughput of the second communication path P2 (YES at S15, refer to state (1) shown in FIG. 1 or refer to FIG. 8), the terminal controller 20 judges whether the network activity 42 of the communication path information of the first communication path P1 is "active" (at S19).

In the case that it is judged that the network activity 42 of the communication path information of the first communication path P1 is "active" (YES at S19), the terminal controller 20 causes the data transfer section 12 to continue the file data transfer using the first communication path P1. The operation of the terminal controller 20 returns to step S13.

On the other hand, in the case that it is judged that the network activity 42 of the communication path information of the first communication path P1 is not "active" (NO at S19), the terminal controller 20 judges that the communication path for file data transfer should be switched from the second communication path P2 to the first communication path P1 (at S20) and outputs a control signal for switching the communication path for file data transfer from the second communication path P2 to the first communication path P1.

According to the control signal output from the terminal controller 20, the communication path controller 16 switches the communication path for file data transfer from the second communication path P2 to the first communication path P1 using the FST technology (at S20). Furthermore, the terminal controller 20 updates the network activity 42 of the second communication path P2 of the communication path information DB to "inactive" and updates the network activity 42 of the first communication path P1 to "active" (at S20, refer to FIG. 8).

Moreover, the terminal controller 20 establishes a traffic stream for throughput measurement at the second communication path P2 (at S21). After step S21, the operation of the terminal controller 20 returns to step S13. The transmission terminal 10 repeats the operation steps from step S13 to step S21 until the file data transfer to the reception terminal 30 is completed.

As a result, the transmission terminal 10 according to this embodiment judges whether or not to switch the communication path for data transfer on the basis of the detection result of the connection or disconnection of the first communication path P1 and the measurement result of the throughputs of the first communication path P1 and the second communication path P2 during the file data transfer. In the case that it is judged that the communication path for data transfer should be switched, the transmission terminal 10 seamlessly switches the communication path for data transfer to the first communication path P1 or the second communication path P2 using the FST technology, establishes traffic streams for file data transfer at the first communication path P1 or the second communication path P2 and transmits data.

Hence, in the communication with the reception terminal 30, the transmission terminal 10 can reduce the overhead required for the switching of the plurality of communication paths for wireless communication, and can seamlessly switch the communication path for data transfer; in other words, need to be aware of the communication path switching operation can be reduced for the user of the terminal.

In addition, the transmission terminal 10 and the reception terminal 30 transmit data (for example, files) using one of the first communication path P1 or the second communication path P2. Hence, the transmission terminal 10 and the reception terminal 30 can perform communication at power consumption lower than that required in the communication in which both the communication paths (the first communication path P1 and the second communication path P2) are used.

Furthermore, in the case that the throughput of the first communication path P1 is larger than the throughput of the second communication path P2, the transmission terminal 10 seamlessly switches the communication path for file data transfer from the second communication path P2 to the first communication path P1, whereby the overhead required for the switching of the communication paths can be reduced.

Similarly, in the case that the throughput of the second communication path P2 is larger than the throughput of the first communication path P1, the transmission terminal 10 seamlessly switches the communication path for file data transfer from the first communication path P1 to the second communication path P2, whereby the overhead required for the switching of the communication paths can be reduced.

Moreover, when the communication at the first communication path P1 is disconnected while the transmission terminal 10 transfers data (for example, files) using the first communication path P1 and measures the throughput using the second communication path P2, the transmission terminal 10 seamlessly switches the communication path for file data transfer from the first communication path P1 to the second communication path P2, whereby the overhead required for the switching of the communication paths can be reduced.

Although various embodiments have been described referring to the drawings, it is needless to say that this disclosure is not limited to these examples. It is obvious that a person skilled in the art can arrive at various alterations or modifications within the scope of the appended claims, and it is to be understood that these alterations or modifications belong to the technical scope of this disclosure.

In this embodiment, the transmission terminal 10 and the reception terminal 30 may use, as a transfer stream for throughput measurement, one of the transfer streams established at the communication path for file data transfer.

Although this embodiment has been described by using a millimeter wave band (for example, 60 GHz) and IEEE 802.11n (for example, 5 GHz) as a plurality of communication paths, the frequency bands of the communication paths are not limited particularly, provided that the combination of communication paths capable of using the FST technology is used.

This application is based on Japanese Patent Application (JP-2012-273276 filed on Dec. 14, 2012, the contents of which are incorporated herein by reference.

INDUSTRIAL APPLICABILITY

This disclosure is usable as a communication terminal for seamlessly switching a communication path for data communication and reducing the overhead required for the switching of communication paths for wireless communication.

DESCRIPTION OF REFERENCE NUMERALS AND SIGNS 10 transmission terminal
11, 31 file DB
12, 32 data transfer section
13, 33 communication path switch
15, 35 communication path integrator
16, 36 communication path controller
17 first communication path connection detector
18 throughput measurement section
19 communication path information DB
20 terminal controller
30 reception terminal
P1 first communication path
P2 second communication path

The invention claimed is:

1. A communication terminal for communicating with a destination terminal using a first communication path and a second communication path, the communication terminal comprising:
    data transfer circuitry, which, in operation, transfers data to be transferred to the destination terminal via the first communication path or the second communication path;
    first communication path connection detecting circuitry, which, in operation, detects a connection or disconnection of the first communication path with the destination terminal;
    throughput measurement circuitry, which, in operation, measures at least one of a throughput of the first communication path and a throughput of the second communication path;
    terminal controlling circuitry coupled to the data transfer circuitry, the first communication path connection detecting circuitry, and the throughput measurement circuitry, wherein the terminal controlling circuitry, in operation, judges whether or not to switch a communication path for data transfer on the basis of a result of a detection of the connection or disconnection of the first communication path by the first communication path connection detecting circuitry and at least one of the throughputs of the first communication path and the second communication path measured by the throughput measurement circuitry; and
    communication path switching circuitry coupled to the terminal controlling circuitry, wherein the communication path switching circuitry, in operation, switches the communication path for data transfer to the first communication path or the second communication path in a case that the terminal controlling circuitry judges to switch the communication path for data transfer.

2. The communication terminal according to claim 1, wherein the throughput measurement circuitry measures the throughput of the second communication path connected to the destination terminal in a case that the first communication path is being used, and measures the throughput of the first communication path in a case that the second communication path is being used.

3. The communication terminal according to claim 1, wherein in a case that the second communication path is being used, the terminal controlling circuitry judges the switching of the communication path for data transfer on the basis of the throughput of the first communication path.

4. The communication terminal according to claim 1, wherein in a case that the second communication path is being used and that the measured throughput of the first communication path is larger than the throughput of the second communication path, the terminal controlling circuitry switches the communication path for data transfer from the second communication path to the first communication path.

5. The communication terminal according to claim 1, wherein in a case that the first communication path is being used and that the measured throughput of the second communication path is larger than the throughput of the first communication path, the terminal controlling circuitry switches the communication path for data transfer from the first communication path to the second communication path.

6. The communication terminal according to claim 1, wherein in a case that the first communication path is being used and that the first communication path is disconnected during the throughput of the second communication path is measured, the terminal controlling circuitry switches the communication path for data transfer from the first communication path to the second communication path.

7. The communication terminal according to claim 1, wherein a frequency band of the first communication path is a 60 GHz band and a frequency band of the second communication path is a 2.4 GHz band or 5 GHz band.

8. The communication terminal according to claim 1, wherein a protocol for switching the communication path for data transfer in the communication path switching circuitry is FST (Fast Session Transfer).

9. The communication terminal according to claim 1, wherein the throughput measurement circuitry transfers throughput measurement data to the first communication path or the second communication path and measures the throughput of the first communication path or the throughput of the second communication path on the basis of the reciprocating time of the throughput measurement data between the communication terminal and the destination terminal.

10. The communication terminal according to claim 1, wherein the throughput measurement circuitry measures the throughput of the first communication path or the throughput of the second communication path on the basis of the reciprocating time of the data being transferred at the first communication path or the second communication path between the communication terminal and the destination terminal.

11. The communication terminal according to claim 9, wherein the throughput measurement data is data used in PING.

* * * * *